United States Patent [19]
Golliver et al.

[11] Patent Number: 6,009,263
[45] Date of Patent: Dec. 28, 1999

[54] EMULATING AGENT AND METHOD FOR REFORMATTING COMPUTER INSTRUCTIONS INTO A STANDARD UNIFORM FORMAT

[75] Inventors: Roger A. Golliver, Beaverton, Oreg.; Gautam Bhagwandas Doshi, Sunnyvale, Calif.; Jerome C. Huck; Alan Hersh Karp, both of Palo Alto, Calif.; Sivakumar Makineni, Sunnyvale, Calif.; Mike Morrison, Santa Clara, Calif.; Glen Colon-Bonet, Fort Collins, Colo.

[73] Assignee: Institute For The Development Of Emerging Architectures, L.L.C., Cupertino, Calif.

[21] Appl. No.: 08/901,471
[22] Filed: Jul. 28, 1997
[51] Int. Cl.$^6$ ................. G06F 9/30; G06F 9/45
[52] U.S. Cl. ............. 395/500.48; 395/500.47; 395/707; 708/204; 709/202; 712/200
[58] Field of Search ............. 395/500, 376, 395/379, 705, 800.01, 707, 500.44, 500.48, 500.49, 500.47; 364/715.03, 748.01, 748.19, 748.16; 712/200, 210; 708/204, 495; 709/202

[56] References Cited
U.S. PATENT DOCUMENTS

| | | | |
|---|---|---|---|
| 4,833,599 | 5/1989 | Coldwell et al. | 364/200 |
| 5,268,855 | 12/1993 | Mason et al. | 364/748 |
| 5,574,927 | 11/1996 | Scantlin | 395/800 |
| 5,699,536 | 12/1997 | Hopkins et al. | 395/392 |
| 5,764,959 | 6/1998 | Sharangpani et al. | 395/500 |
| 5,805,475 | 9/1998 | Putrino et al. | 364/715.03 |
| 5,930,495 | 7/1999 | Christopher et al. | 395/500 |

*Primary Examiner*—Kevin J. Teska
*Assistant Examiner*—Thai Phan
*Attorney, Agent, or Firm*—Blakely Sokoloff Taylor & Zafman, LLP

[57] ABSTRACT

An emulating agent and method is provided that receives numbers having signs, exponents and significands of varying lengths and possibly configured in a variety of incompatible formats and to reformat the numbers into a standard uniform format for uniform arithmetic computations in processors operating with different architectures. In one embodiment, the emulating agent has a three-field superset register configured to receive the sign of a number in a first field, the exponent of a number in a second field and the significand of a number in a third field, regardless of the original format of the number, resulting in a number represented in a standard uniform format for computation. The embodiment also allows high level access to the fields to allow users to control the size of the numbers inserted into the fields.

14 Claims, 2 Drawing Sheets

EMULATING AGENT AND METHOD FOR REFORMATTING COMPUTER INSTRUCTIONS INTO A STANDARD UNIFORM FORMAT

RELATED APPLICATIONS

The present application is related to co-pending application entitled "Method, Apparatus and Computer System for Directly Transferring and Translating Data Between an Integer Processing Unit and a Floating Point Processing Unit," filed on Oct. 10, 1996, Ser. No. 08/728,646.

BACKGROUND OF THE INVENTION

1. Field of the Invention

The present invention generally relates to data formatting in computer systems and, more particularly, relates to an emulating agent for uniform formatting of data.

2. Background

In a computer systems having a single central processing unit, numbers are transferred using a uniform number format. The format typically allows the system to distinguish among the sign, exponent, and a significand of a number. In a properly designed system, there would be no reason to have incompatible formats in a single system.

In contrast, in a computer system having multiple processors with different architectures, there may arise incompatibilities of formats among number values produced by separate processors. The incompatibilities typically involve numbers that have signs, exponents, or significands represented in a format corresponding to a particular processor that are a different length from those of another processor in the same system. Each processor will typically have registers that are designed to accommodate its own format. As a result, registers of one processor architecture may not be able to accommodate numbers produced by another processor having a different format. This incompatibility will cause errors in computations when numbers are transferred to a processor having a format that is incompatible with the processor sending the number.

One solution is to use a different register for each number format. The Motorola 88000 series of processors was made compatible to the Intel single, double and double-extended precision formats. In this application, a different register was used for each size of precision. Thus, no numbers of incompatible formats went to the same register.

Another solution to this problem was accomplished by Digital Equipment Corporation (DEC) to employ both the VAX format and the IEEE format in a single size register file. The operands for numbers were encoded in the same size 64-bit register file. Both encodings, however, were the same size and both single and double precision results were stored in the same register. Both the VAX and the IEEE format had 32-bit registers for storing and retrieving single precision numbers as well as 64-bit registers for storing and retrieving double precision numbers. Formats of varying and incompatible lengths did not exist in that application and, thus, no incompatible formats occurred. Thus, the formats were essentially compatible in that a varying size register was not required to accommodate the different formats.

Yet another example was incorporated in the Pentium™ microprocessor produced by Intel Corporation of Santa Clara, Calif., that had a 17-bit exponent range internal to the microcode. This allowed for varying-sized exponents of numbers that were used in the microcode. This application with the extended exponent range, however, was not accessible using compilers or other high level languages, such as assembly language programmers and was, thus, not accessible to a computer user.

Therefore, it would be of great use in the microprocessor industry if a device and method were available to emulate processors of different architectures so that numbers of incompatible formats could be transferred, exchanged and computed upon among processors having different architectures. Also, it would be most useful if the ability to transfer, exchange and compute numbers of incompatible formats among processors of different architectures were made available to the user so that the advantage of using incompatible numbers were realized by users of compilers, high level languages and assembly language. As will be seen, the present invention accomplishes this in a simple and elegant manner.

SUMMARY OF THE INVENTION

An emulating agent and method is provided that receives numbers having signs, exponents and significands of varying lengths and possibly configured in a variety of incompatible formats and to reformat the numbers into a standard uniform format for uniform arithmetic computations in processors operating with different architectures. In one embodiment, the emulating agent has a three-field superset register configured to receive the sign of a number in a first field, the exponent of a number in a second field and the significand of a number in a third field, regardless of the original format of the number, resulting in a number represented in a standard uniform format for computation. The embodiment also allows high level access to the fields to allow users to control the size of the numbers inserted into the fields.

DETAILED DESCRIPTION

An emulating agent and method are provided for receiving numbers having signs, exponents and significands possibly configured in a variety of incompatible formats and for reformatting the numbers into a standard uniform format so that uniform arithmetic computations can be performed. In the following description, numerous specific details are set forth in order to provide a thorough understanding of the invention. However, it will be appreciated by those skilled in the art that the invention may be practiced without such details. In other instances, well-known elements have not been described in detail in order to avoid obscuring the invention. A particular embodiment is disclosed for illustration that includes the architecture computation styles of a microprocessor known in the art as a PA-RISC processor produced by Hewlett Packard of Cupertino, Calif. and an architecture known in the art as iA produced by Intel Corporation of Santa Clara, Calif. Details of these architectures are given in the following description and are intended only as an illustrative example. Enablement of the invention as described below and claimed in the following claims does not require the use of these two architecture computation styles and is by no means limited to their use.

In one embodiment of the present invention, six data types are directly supported. These data types are defined by their parameters. They are: the three IEEE-compatible real types, single, double and double-extended real; the two integer types, 64-bit signed and 64-bit unsigned integers; the register file format; and parallel (SIMD) format where a pair of IEEE single precision values occupy a single floating-point register's significand. A seventh data type, IEEE style quad-precision is supported via software or hardware routines. The parameters for the real data types are summarized in Table 1.

TABLE 1

Real Data Type Properties

| IEEE Real Type Parameters | Real Types | | | |
|---|---|---|---|---|
| | Single | Double | Double-Extended | Quad-Style |
| sign | + or − | + or − | + or − | + or − |
| $E_{max}$ | +127 | +1023 | +16383 | +16383 |
| $E_{min}$ | −126 | −1022 | −16382 | −16382 |
| exponent bias | +127 | +1023 | +16383 | +16383 |
| precision in bits | 24 | 53 | 64 | 113 |
| IEEE Memory Formats | | | | |
| total memory format width in bits | 32 | 64 | 80 | 128 |
| sign field width in bits | 1 | 1 | 1 | 1 |
| exponent field width in bits | 8 | 11 | 15 | 15 |
| significand field width in bits | 23 | 52 | 64 | 112 |

Figure 1:
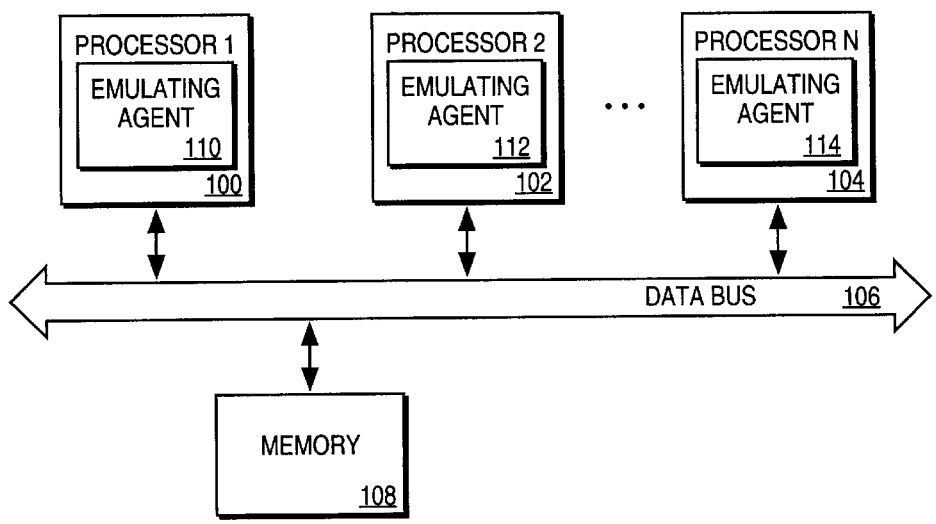
FIG. 1 is a general block diagram of a computer system incorporating one embodiment of an emulating agent in accordance with the present invention.

Referring now to FIG. 1, a computer system incorporating one embodiment of the present invention is illustrated. The system includes one or more processors 100–104 coupled to and communicating with a common data bus 106 for transferring data throughout the computer system. Also coupled and communicating with the data bus is a memory unit 108 that can include various types of memory including RAM, ROM, FLASH memory, synchronous RAM, asynchronous RAM, synchronous DRAM, asynchronous DRAM, and other types of memory. The type of memory employed in a computer system for purposes of the present invention is not limited to any particular type of memory and thus, is not limited by any particular type of memory so incorporated. Emulating agents 110, 112 and 114 embodying the present invention are incorporated into microprocessors 100, 102, 104 respectively. The computer system could also include a memory interface (not shown) for optimized communication among the processors 100, 102, 104 incorporating emulating agents 110, 112, 114, the data bus 106 and the memory 108. Different types of memory interfaces are well known in the art, however, incorporation of any such memory interface with a computer system incorporating the present invention would not depart from the spirit and scope of the emulating agent and corresponding emulation method described and claimed below.

Figure 2:
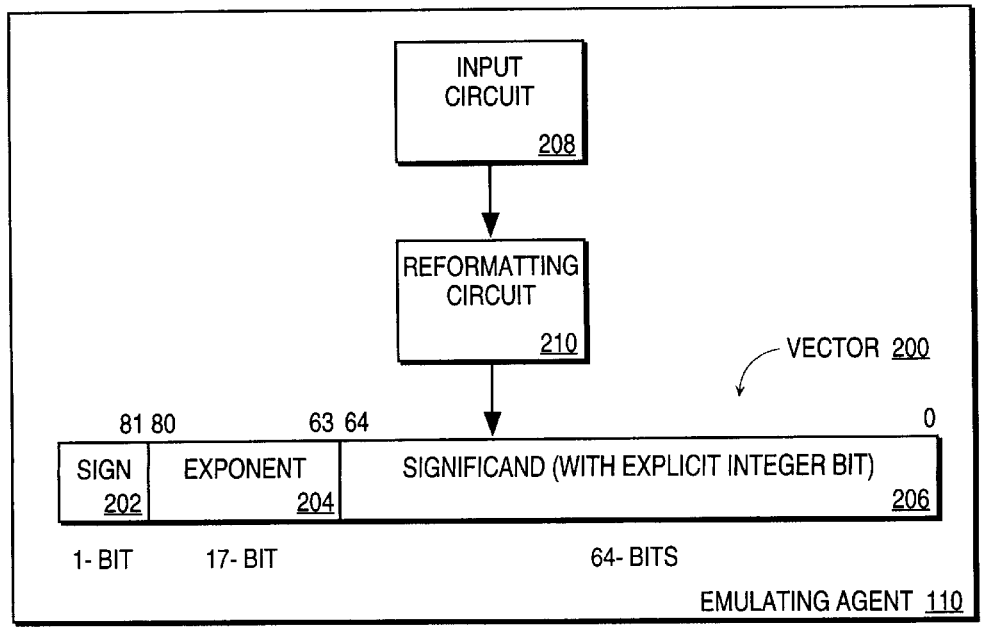
FIG. 2 is a block diagram of one embodiment the internal register of an emulating agent in accordance with one embodiment of the present invention.

Now referring to FIG. 2, a vector 200 is shown that illustrates where the emulating agent separates and distinguishes the three components of a number, the sign, the exponent and the significand, and places them in three distinct fields for uniform computation of numbers being represented in incompatible formats. In one embodiment of the present invention, the sign of a number is represented in a first field 202 which is composed of a single bit representing the sign of a number. In this particular embodiment, the sign bit is designated in the leftmost position of the vector.

A second field, the exponent field 204, occupies 17 bits {80:64} of the vector. This extended exponent is designed to accommodate 17 bits in order to act as a superset for all data types thait may have exponents that vary in length. An exponent field larger than 17 bits can also be incorporated, however, the choice of 17 bits was a particular design choice for a system designed to accommodate the iA data type and the PA-RISC data type and is specific to the illustrative embodiment described herein. As a design choice, a larger exponent field may be chosen in order to create a superset of other data types requiring larger exponent fields. Such a choice, however, would not depart from the spirit and scope of the present invention, an object of which is to create a vector, represented either as a hardware register or a software representation of a register in order to accommodate one or more data types having incompatible formats.

Still referring to FIG. 2, the vector 200 includes a third field 206 occupying 64 bits {63:0} of the vector 200 in order to accommodate a significand with up to 64 bits including an explicit integer bit. Similar to the second field for accommodating the exponent, the third field 206 is illustrated occupying 64 bits which, for purposes of the present invention, is arbitrary. Sixty-four bits was chosen as a particular design choice for accommodating significands that would occur in iA and PA-RISC data types. Like the field accommodating the exponents, the field designed to accommodate significands is intended for purposes of the present invention to be a superset that is capable of accommodating significands of different numbers being represented in incompatible formats that may have significands of varying length. This third field could be designed larger than 64 bits in order to accommodate significands of other data types, however, such a design would not depart from the spirit and scope of the present invention which one object is to provide a representative vector in a form of a superset register in hardware form or in a software representation that accommodates signs, exponents and significands of numbers represented in incompatible formats that result in exponents and significands having varying lengths.

Figure 3:
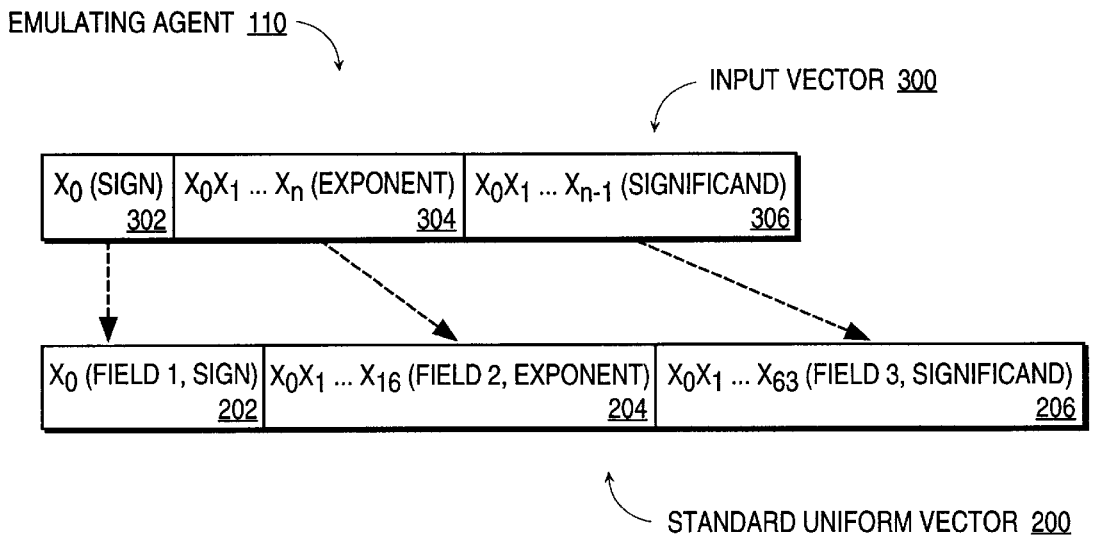
FIG. 3 is a block diagram of one embodiment the internal register of an emulating agent in accordance with one embodiment of the present invention.

Referring now to FIG. 3, a graphic illustration of the general operation within the emulating agent is illustrated. An input vector 300 is shown that includes a first field 302 representing the sign of a number, a second field 304, representing the exponent of a number and having a predetermined length according to the format of the input number, and a third field 306 representing the significand of the input number and having a predetermined length according to the format of the input number. The emulating agent 110, by use of software methods discussed below, receives a given input number, separates the sign, exponent and significand in separate fields and places them in a standard uniform vector 200 illustrated in FIG. 3. Details of how a particular embodiment that accommodates the iA and PA-RISC data types is described in detail below.

Generally, the emulating agent extracts the representation of a sign from field 302 of the input number and places it in the first field 202 of the standard uniform vector. The field could be from a location in memory or some other source. The standard uniform vector is configured to receive representation of a sign and place it in a uniform format in the standard uniform vector 200. Similarly, emulating agent 110 is further configured to extract the exponent from the second field 304 of the input number and place it in the second field 204 of the standard uniform vector with the most significant bit of the represented exponent coinciding with the most significant bit of the second field 204. This configuration allows for placement of the exponent in the uniform standard vector 200 with possible length to spare for possible exponents of varying length.

Similar to the treatment of the exponent, the emulating agent 110 extracts the significand from the third field 306 of the input vector 300 and places it in the third field 206 of the standard uniform vector 200 such that the most significant bit of the represented significand of the input number coincides with the most significand bit of the third field 206. Thus, a significand of a number can be accommodated in the third field 206 with possible length to spare regardless of its particular length.

Once placed in the three fields, the represented input number, now in a standard form, can have computations performed on it or can participate in computations with other numbers of possible incompatible formats in the computer system. As a result, processors that communicate within the computer system with other processors that may generate numbers in formats that are incompatible with other processors can share numbers with these processors regardless of the incompatibility of their respective formats.

In a computer system that incorporates the present invention, data that reside in the floating-point registers can be either real numbers or integers. The format of data in the floating-point registers is designed to accommodate each of these data types with no loss of information. Real numbers can reside in the floating-point registers in a binary field format that is 82 bits wide. An example of three fields are:

A 64-bit significand field, $b_{63}$ $b_{62}$ $b_{61}$ ... $b_1$ $b_0$, is the number's significant digits. This field is composed of an explicit integer bit (significand {63}), and 63 bits of fraction (significand {62:0}).

A 17-bit exponent field, this field locates the binary point within or beyond the significant digits and, therefore, determines the number's magnitude. The exponent field is biased by 65535 or equivalently 0xFFFF. An exponent field of all logic ones is used to encode the special values for IEEE signed Infinity, NaN and NaTVal. An exponent field of all 0's and a significand of all 0's is used to encode the special values for IEEE signed 0's.

A 1-bit sign field, which indicates whether the number is positive, sign=0, or negative, sign=1. The value of an infinite and non-zero floating-point value encoded in the register file can be calculated using the following expression:

$$(-1)^{(sign)} \cdot 2^{(exponent-65535)} \cdot (\text{significand}\{63\}.\text{significandl}\{62:0\}_2)$$

The emulating agent 110 of FIG. 1, with further details discussed below, encodes the values from each processor in a register file format illustrated in Table 2.

TABLE 2

Register File Encodings

| Class (or subclass example) | Sign: 1 bit | Biased Exponent: 17 bits | Significand: 64 bits, i.bb ... bb (explicit integer bit is shown) |
|---|---|---|---|
| Infinity | 0/1 | 0x1FFFF | 1.000 ... 00 |
| Pseudo-Infinity | 0/1 | 0x1FFFF | 0.000 ... 00 |
| NaTVal | 0 | 0.1FFFF | 0.010 ... 00 |
| NaNs | 0/1 | 0x1FFFF | 1.000 ... 01 through 1.111 ... 11 |
| Quiet NaN Indefinite (Created by Invalid Operation) | 1 | 0x1FFFF | 1.100 ... 00 |
| Quiet NaNs | 0/1 | 0x1FFFF | 1.100 ... 00 through 1.111 ... 11 |
| Signaling NaNs | 0/1 | 0x1FFFF | 1.000 ... 01 through 1.011 ... 11 |
| Pseudo-Nans | 0/1 | 0x1FFFF | 0.000 ... 01 through 0.111 ... 11 (except NaTVal's: 0.010 ... 00) |
| Normalized Numbers | 0/1 | 0x00001 through 0x1FFFE | 1.000 ... 00 through 1.111 ... 11 |
| Single Real Normals (PA-RI5C and Memory) | 0/1 | 0x0FF81 through 0x1007E | 1.000 ... 00 ... (40 count)0s through 1.111 ... 11 ... (40 count)0s |
| Single Real Normals (iA Stack) | 0/1 | 0x0C001 through 0x13FFE | 1.000 ... 00 ... (40 count)0s through 1.111 ... 11 ... (40 count)0s |
| Single Real Normals (Full Register File) | 0/1 | 0x00001 tbrough 0x1FFFE | 1.000 ... 00 ... (40 count)0s through 1.111 ... 11 ... (40 count)0s |
| Double Rea) Normals (PA-RISC and Memory) | 0/1 | 0x0FC01 through 0x103FE | 1.000 ... 0000000000000 through 1.111 ... 1100000000000 |
| Double Rea) Normals (iA Stack) | 0/1 | 0x0C001 through 0x13FFE | 1.000 ... 0000000000000 through 1.111 ... 1100000000000 |
| Double Real Nonmals (Full Register File) | 0/1 | 0x00001 through 0x1FFFE | 1.000 ... 0000000000000 through 1.111 ... 1100000000000 |
| Double-Extended Real Normals (iA Stack and Memory) | 0/1 | 0x0C001 through 0x13FFE | 1.000 ... 00 through 1.111 ... 11 |
| Full Register File Real Normals | 0/1 | 0x00001 through | 1.000 ... 00 through 1.111 ... 11 |

TABLE 2-continued

Register File Encodings

| Class (or subclass example) | Sign: 1 bit | Biased Exponent: 17 bits | Significand: 64 bits, i.bb . . . bb (explicit integer bit is shown) |
|---|---|---|---|
| Canonical Non-Zero Integers or SIMD-FP (Large Unsigned or Negative Signed Integers) | 0 | 0x1FFFE 0x1003E | 1.000 . . . 00 through 1.111 . . . 11 |
| Unnormalized Numbers | 0/1 | 0x00000 through 0x1FFFE | 0.000 . . . 01 through 0.111 . . . 11 |
| Canonical Non-Zero Integers or SIMD-FP (Positive Unsigned or Signed Integers) | 0 | 0x1003E | 0.000 . . . 01 through 0.111 . . . 11 |
| Canonical Single Real Denormals (PA-RISC and Memory) | 0/1 | 0x0FF81 | 0.000 . . . 01 . . . (40 count)0s through 0.111 . . . 11 . . . (40 count)0s |
| Canonical Double Real Denormals (PA-RISC and Memory) | 0/1 | 0x0FC01 | 0.000 . . . 0100000000000 through 0.111 . . . 1100000000000 |
| Canonical Full Register File Denormals | 0/1 | 0x00001 | 0.000 . . . 0100000000000 through 0.111 . . . 1100000000000 |
| Pseudo-Zero | 0/1 | 0x00001 through 0x1FFFE | 0.000 . . . 00 |
| Double-Extended Real Pseudo-Denormals (iA Stack and Memory) | 0/1 | 0x00000 | 1.000 . . . 00 through 1.111 . . . 11 |
| Canonicai Double-Extended Real Denormals (iA Stack and Memory) | 0/1 | 0x00000 | 0.000 . . . 01 through 0.111 . . . 11 |
| Zero | 0/1 | 0x00000 | 0.000 . . . 00 |
| Canonical Zero Integer or SIMD-FP (Signed or Unsigned) | 0 | 0x00000 | 0.000 . . . 00 |
| FR 0 (positive zero, also a pair of zeros for SIMD) | 0 | 0x00000 | 0.000 . . . 00 |
| FR 1 (positive one) | 0 | 0x0FFFF | 1.000 . . . 00 |

Also included in Table 2 are values for constant floating-point registers FR0 and FR1. Table 2 illustrates the form in which the values of the sign, exponent and significand are placed in the standard uniform vector.

In one embodiment of the present invention, the placement of each of the sign, exponent, and significand components in the standard uniform vector is controlled by computer software. A sample computational model showing control fields used by software algorithms to place the numbers in the standard uniform vector is shown in Table 3.

TABLE 3

Floating-point Computation Model Control Definitions

| Computational model control fields | | | Computation model selected | | |
|---|---|---|---|---|---|
| instructions's .pc completer | FPSR.sfx's dynamic pc field | FPSR.sfx's dynamic wre field | significand's width of precision | exponent range | computational style |
| Parallel FP | ignored | ignored | 24-bit precision | 8 bits | A pair of PA-RISC Singles |
| .s | ignored | 0 | 24-bit precision | 8 bits | PA-RISC Single |
| .d | ignored | 0 | 53-bit precision | 11 bits | PA-RISC Double |
| .s | ignored | 1 | 24-bit precision | 17 bits | Full Register File Single |
| .d | ignored | 1 | 53-bit precision | 17 bits | Full Register File Double |
| none[a] | 00 | 0 | 24-bit precision | 15 bits | iA Stack Single |
| none | 10 | 0 | 53-bit precision | 15 bits | iA Stack Double |
| none | 11 | 0 | 64-bit precision | 15 bits | iA Double-extended |
| none | 00 | 1 | 24-bit precision | 17 bits | Full Register File Single |
| none | 10 | 1 | 53-bit precision | 17 bits | Full Register File Double |
| none | 11 | 1 | 64-bit precision | 17 bits | Full Register File Double-extended |
| none | 01 | ignored | N.A. | N.A. | Reserved |
| not applicable[b] | ignored | ignored | 64-bit precision | 17 bits | Full Register File Double-Extended |

[a]The default value for instructions that have a .pc completer and it is not specified.
[b]For instructions which have no .pc completer (ex. fmerge).

As can be seen in Table 3, the computational model can be divided into three model control fields that correspond to the significand's width of precision and designated exponent range that correspond to a particular computational style. It will be understood by those skilled in the art that other computational models are possible. The particular model set forth in Table 3 is meant as an illustration for consideration with the particular illustrative embodiment discussed herein. Thus, design of another computational model with a different number of fields or a different selection of commands would in no way depart from the spirit and scope of the present invention.

As can be seen in Table 3, the computational model control fields are divided into a software instruction's precision control (.pc) completer, or processor control completer, a dynamic pc field, or processor control field, and a dynamic widest range exponent (wre) field. Two examples of algorithms that employ these computational model control fields are set forth below in connection with the floating-point register and memory formats. An instruction's .pc completer, along with the three control fields, wre, pc and rounding control (rc), rc specifying the rounding direction in the event that the result is not exact. Again, the method in which the result's significand precision and exponent range is determined as illustrated in Table 3.

Memory access instructions are required in order for proper format conversion. Table 4 illustrates a sample of instructions for memory access in different operations involved in the format conversion. There are separate floating-point load and store instructions for the single, double and double extended floating-point real data type and the packed signed or unsigned integer data. In a preferred embodiment, the addressing modes and memory hint options for floating-point load and store instructions are the same with the integer load and store instructions. Table 4 illustrates a list of sample floating-point load/store instructions.

data type, i.e., single, double, double-extended, as the store instructions for the format conversion to be correct. Thus, if a single precision result is produced, it must have had to originate from a previous arithmetic operation using single precision.

Saving and restoring of the floating-point register format in a 128-bit memory container is accomplished by the "spill" and "fill" instructions (stfq.spill, 1dfq.fill). These instructions are designated for saving and restoring the actual register contents and they are designed not to trap on NaTVal. They save and restore correctly all data types, i.e., single, double, double-extended, register and integer, and they will ensure compatibility with different architecture extensions.

An example of a model 4 memory format corresponding with a floating-point register file format is illustrated in Table 5, below.

TABLE 4

Floating-point Memory Access and Register Transfer Instructions

| Operations | Load to FR | Load pair to FR | Store from FR | GR to FR | GR from FR |
|---|---|---|---|---|---|
| Single | ldfs | ldfps | stfs | setf.s | getf.s |
| Integer or SIMD-FP | ldf8 | ldfp8 | stf8 | setf.sig | getf.sig |
| Double | ldfd | ldfpd | stfd | setf.d | getf.d |
| Double-extended | ldfe | | stfe | | |
| Spill/fill | ldfq.fill | | stfq.spill | | |
| Sign and Exponent | | | | setf.exp | getf.exp |
| Significand | | | | setf.sig | getf.sig |

The floating-point store instructions (stfs, stfd, stfe) require the value in the Floating Point Register file to have the same

TABLE 5

Memory to Register File format translation

| memory format | | | | Floating-point register file format | | | |
|---|---|---|---|---|---|---|---|
| class | sign | exponent | significand | single | double | double-extended | register fill |
| | | | | | | register's sign field | |
| positive | 0 | ignore | ignore | 0 | 0 | 0 | 0 |
| negative | 1 | ignore | ignore | 1 | 1 | 1 | 1 |
| | | | | | | register's exponent field | |
| true zero | ignore | 000 ... 00 | 000 ... 00 | 0x00000 | 0x00000 | 0x00000 | 0x00000 |
| (pseudo-) denormal | ignore | 000 ... 00 | 000 ... 01 through 111 ... 11 | exponent +0x0FF81 | exponent +0x0FC01 | exponent (0x00000) | exponent |
| normal | ignore | 000 ... 01 through 111 ... 10 | 000 ... 00 through 111 ... 11 | exponent +0x0FF80 | exponent +0x0FC00 | exponent +0xC000 | exponent |
| exponent | ignore | 111 ... 11 | ignore | 0x1FFFF | 0x1FFFF | 0x1FFFF | 0x1FFFF |

TABLE 5-continued

Memory to Register File format translation

| | memory format | | | Floating-point register file format | | | |
|---|---|---|---|---|---|---|---|
| class | sign | exponent | significand | single | double | double-extended | register fill |
| all ones | | | | | | register's significand field | |
| zero | ignore | 000 . . . 00 | 000 . . . 00 | significand <<40 | significand <<11 | significand | significand |
| (pseudo-) denormal | ignore | 000 . . . 00 | 000 . . . 01 through 111 . . . 11 | significand <<40 | significand <<1 | significand | significand |
| other | ignore | 000 . . . 01 through 111 . . . 11 | 000 . . . 00 through 111 . . . 11 | 1.significand <<40 | 1.significand <<11 | significand | significand |

For integer data types, the translation from general register format to floating-point register format is illustrated in Table 6.

TABLE 6

Integer to Register File format translation

| Integer (GR or Memory) format and SIMD-FP Memory | | | Floating-point register file format | | |
|---|---|---|---|---|---|
| | | Integer | | | |
| class | NaT | or SIMD-FP | sign | exponent | significand |
| Nat or Spec Id | 1 | ignore | | NaTVal | |
| zero | 0 | 000 . . . 00 | 0 | 0x00000 | 0 |
| non-zero | 0 | 000 . . . 01 through 111 . . . 11 | 0 | 0x1003E | integer |

For real data types, the translation from register file format to memory format is illustrated in Table 7.

TABLE 7

Register File format to Memory format translation

| Floating-point register file format | | | | memory format | | | |
|---|---|---|---|---|---|---|---|
| class | sign | exponent | significand | single | double | double-extended | register spill |
| positive | 0 | ignore | ignore | 0 | memory's sign field 0 | 0 | 0 |
| negative | 1 | ignore | ignore | 1 | 1 | 1 | 1 |
| zero exponent | ignore | 0x00000 | ignore | 0x00 | memory's exponent field 0x000 | 0x0000 | exponent |
| zero significand | ignore | 0x00001 through 0x1FFFE | 0.000 . . . 00 | exponent - 0xFF81 | exponent - 0xFC01 | exponent - 0xC000 | exponent |
| unnormal | ignore | 0x00001 through 0x1FFFE | 0.000 . . . 01 through 0.111 . . . 11 | exponent - 0xFF81 | exponent - 0xFC01 | exponent - 0xC000 | exponent |
| normal | ignore | 0x00001 through 0x1FFFE | 1.000 . . . 00 through 1.111 . . . 11 | exponent - 0xFF80 | exponent - 0xFC00 | exponent - 0xC000 | exponent |
| other | ignore | 0x1FFFF | ignore | 0xFF | 0x7FF | 0x7FFF | exponent |
| anything | ignore | ignore | ignore | significand >>40 | memory's significand field significand >>11 | significand | significand |

For integer data types, the translation from floating-point register format to general register file format is illustrated in Table 8.

TABLE 8

Register File to Integer format translation

| Floating-point register file format | | | | Integer (GR or Memory) format or SIMD-FP | |
|---|---|---|---|---|---|
| class | sign | exponent | significand | NaT or Spec. Fault st | integer |
| NaTVal | 0 | 0x1FFFF | 0.010 . . . 00 | 1 | significand |
| zero | ignore | 0x00000 | 0.000 . . . 00 | 0 | significand |
| non-zero | 0 | 0x1003E | 0.000 . . . 01 | 0 | significand |

TABLE 8-continued

Register File to Integer format translation

| | Floating-point register file format | | | NaT or Spec. | Integer (GR or Memory) format or SIMD-FP |
|---|---|---|---|---|---|
| class | sign | exponent | significand | Fault st | integer |
| other | ignore | ignore | through<br>1.111 . . . 11<br>0.000 . . . 01<br>through<br>1.111 . . . 11 | 0 | significand |

Both little- and big-endian byte ordering is supported on floating-point load operations and store operations. For both single and double memory formats, the byte ordering is identical to the 32-bit and 64-bit integer data types.

In a preferred embodiment, the following IEEE mandated operations are implemented under software control: string-to-float conversions; float-to-string conversions; divide; square root; REM; float-to-integer valued float conversion, correctly wrapping the exponent for single, double and double-extended overflow and underflow values, as recommended by IEEE standards; and support for the IEEE quad-precision real data type. It will be appreciated by those skilled in the art that for "illegal transactions", for example storing a double denormal in single precision, other choices for translation are possible. The present invention is not intended to be limited to a particular translation for this purpose.

Example of an algorithm that accomplishes transfer from the floating-point register to the memory format of a computer system employing an emulating agent according to the present invention is as follows:

```
memory_type
fr_to_mem_format (fp_reg_type freg, uint_t size, uint_t real_form)
{
    memory_type tmp_mem;
    switch(size) {
        case 4: /* single */
            tmp_mem.fp_single.sign = freg.sign;
            if (freg.exponent == 0)
                tmp_mem.fp_single.exponent = 0;
            else if (freg.exponent == FP_REG_EXP_ONES)
                tmp_mem.fp_single.exponent = FP_SGL_EXP_ONES;
            else if ((freg.significand>>63) == 0)
                tmp_mem.fp_single.exponent = (uint_t)
                    (((int_t)freg.exponent)
                    - FP_RFG_BIAS + FP_SGL_BIAS - 1);
            else
                tmp_mem.fp_single.exponent = (uint_t)
                    (((int_t)freg.exponent)
                    - FP_REG_BIAS + FP_SGL_BIAS);
            tmp_mem.fp_single.significand =
                (freg.significand<<(64 - 62 - 1))>>(40 + 64 - 62 - 1);
            break;
        case 8: /* double */
            if (!real_form)
                tmp_mem.uint_64.uvalue = freg.significand;
            else { /* real_form */
                tmp_mem.fp_double.sign = freg.sign;
                if (freg.exponent == 0)
                    tmp_mem.fp_double.exponent = 0;
                else if ((freg.exponent == FP_REG_EXP_ONES)
                    tmp_mem.fp_double.exponent = FP_DBL_EXP_ONES;
                else if ((freg.significand >> 63) == 0)
                    tmp_mem.fp_double.exponent = (uint_t)
                        (((int_t)freg.exponent)
                        - FP_REG_BIA + FP_DBL_BIAS - 1);
                else
                    tmp_mem.fp_double.exponent = (uint_t)
                        (((int_t)freg.exponent)
                        - FP_REG_BIAS + FP_DBL_BIAS);
                tmp_mem.fp_double.significand =
                    (freg.significand<<(64 - 62 - 1)) >> (11 + 64 - 62 - 1);
            }
            break;
        case 10: /* double extended */
            tmp_mem.fp_double_extended.sign = freg.sign;
            if (freg.exponent == 0)
                /* Zero or (Pseudo-) Denormal */
                tmp_mem.fp_double_extended.exponent = 0;
            } else if (freg.exponent == FP_REG_EXP_ONES) {
                /* Inf/NaN/NatVAL */
                tmp_mem.fp_double_extended.exponent =
                    FP_EXT_EXP_ONES;
            } else {
                /* Normal or Unnormal */
                tmp_mem.fp_double_extended.exponent = (uint_t)
                    (((int_t)freg.exponent)
                    - FP_REG_BIAS + FP_EXT_BIAS);
            }
            tmp_mem.fp_double_extended.significand = freg.significand;
            break;
        case 16: /* spill */
            tmp_mem.fp_spill_fill.reserved = 0;
            tmp_mem.fp_spill_fill.sign = freg.sign;
            tmp_mem.fp_spill_fill.exponent = freg.exponent;
            tmp_mem.fp_spill_fill.significant = freg.significand;
            break;
    } return (tmp_mem);
}
```

Further examples can be found in the related co-pending patent application entitled "Method, Apparatus and Computer System for Directly Transferring and Translating Data Between an Integer Processing Unit and a Floating Point Processing Unit," filed on Oct. 10, 1996, Ser. No. 08/728,646.

An algorithm illustrating an example of software control of data and memory to the floating-point register format is as follows:

```
fp_reg_type
mem_to_fr_format (memory_type mem, uint_t size, uint_t real_form)
{
    fp_reg_type tmp_freg;
    switch(size) {
        case4: /* single */
            tmp_freg.sign = mem.fpsingle.sign;
            if ((mem.fp_single.exponent == 0)
                && (mem.fp_single.significand == 0)) {
                /* zero */
                tmp_freg.exponent = 0;
            } else if (mem.fp_single.exponent == 0) {
                /* denormal */
                tmp_freg.exponent = (uint_t)
                    (((int_t) mem.fp_single.exponent
                    - FP_SGL_BIAS + FP_REG_BIAS + 1);
            } else if (mem.fp_single.exponent == FP_SGL_EXP_ONES) {
                /* Inf, NaN, NaTVal */
                tmp_freg.exponent = FP_REG_EXP_ONES;
            } else {
                tmp_freg.exponent = (uint_t)
                    (((int_t) mem.fp_single.exponent)
                    - FP_SGL_BIAS + FP_REG_BIAS);
            }
            tmp_freg.significand =
                (((uint64_t) mem.fp_single.significand)<<40)
                | (((mem.fp_single.exponent != 0)?U64_1:U64_0)<<63);
            break;
        case8: /* double */
```

```
        if (!real_form) {
            tmp_freg.sign = 0;
            tmp_freg.significand = mem.uint_64.uvalue;
            if (tmp_freg.significand)
        tmp_freg.exponent = FP_INTEGER_EXP;
            else
        tmp_freg.exponent = 0x00000;
        } else {
            tmp_freg.sign = mem.fp_double.sign;
            if ((mem.fp_double.exponent == 0)
                && (mem.fp_double.significand == U64_0)) {
                /* zero */
        tmp_freg.exponent = 0;
            } else if (mem.fp_double.exponent == 0) {
                /* denormal */
        tmp_freg.exponent = (uint_t)
                (((int_t) mem.fp_double exponent)
                - FP_DBL_BIAS + FP_REG_BIAS + 1);
            } else if (mem.fp_double.exponent ==
                FP_DBL_EXP_ONES) {
                /* Inf, NaN, NaTVal */
        tmp_freg.exponent = FP_REG_EXP_ONES;
            { else }
        tmp_freg.exponent = (uint_t)
                (((int_t) mem.fp_double.exponent)
                -FP_DBL_BIAS + FP_REG_BIAS);
            }
            tmp_freg.significand =
                (((uint64_t) mem.fp_double.significand)<<11)
                | (((mem.fp_double.exponent != 0) ?U64_1:U64)<<63);
            }
            break;
        case 10: /* double extended */
            tmp_freg.sign = mem.fp_double_extended.sign;
            if (mem.fp_double_extended.exonent == 0) {
            /* Zero or (Pseudo-) Denormal */
                tmp_freg exponent = 0;
            } else if (mem.fp_double_extended.exponent ==
                FP_EXT_EXP_ONES) {
            /* Inf, NaN, NaTVal */
                tmp_freg.exponent = FP_REG_EXP_ONES;
            } else { /* Normal */
                tmp_freg.exponent = (uint_t)
                    (((int_t) mem.fp_double_extended.exponent)
                    - FP_EXT_BIAS + FP_REG_BIAS);
            }
            tmp_freg.significand = mem.fp_double_extended.significand;
            break;
        case 16: /* fill */
            tmp_freg.sign = mem.fp_spill_fill.sign;
            tmp_freg.exponent = mem.fp_spill_fill.exponent;
            tmp_freg.significand = mem.fp_spill_fill.significand;
            break
        }
        return (tmp_freg);
    }
```

Figure 4:
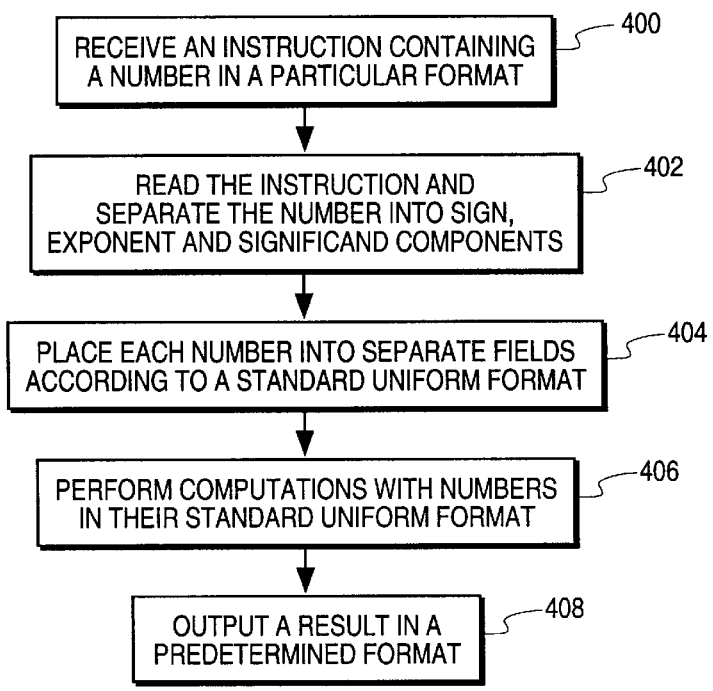
FIG. 4 is a flow chart illustrating the functions of one embodiment of the present invention.

Generally, the method employed by the emulating agent in placing the components of an input number into a standard uniform vector includes five basic steps. These are illustrated in FIG. 4. The method starts at step 400 with receiving an instruction containing a number in a particular format. This format can be any one of a number of formats that is recognized by the emulating agent. The instructions cannot be of a format that is foreign to the controls of the emulating agent, since emulating agent must know how to extract the separate components, the sign, the exponent and the significand, of the instruction. The software control would need to be able to recognize the different formats and be able to extract the data from each respective format and place them into the standard uniform vector. Of course, the software can be easily modified to include more formats for the emulating agent to recognize.

The next step 402 involves reading the instruction and separating the number into the sign, exponent and significand components. Again, this is done by software control. In the event that the operations are string-to-float conversions, float-to-string conversions, divide, square root, REM, floating-point to integer valued float conversion, direct wrapping of the exponent as recommended by the IEEE standard and also support for the IEEE style quad-precision real data types.

The next step 404 is placing each component into separate fields according to a standard uniform format. As illustrated above, this involves placing the sign, exponent and significand into the three fields of the standard uniform vector.

The next step 406 is performing the computations with the numbers in their standard uniform format. This includes rounding to the proper precision according to the instruction.

The final step 408 is outputting a result in a predetermined format. This predetermined format could be determined by the instructions sent by the processors. This format could also be under control of software so that the user can output the results in any particular format.

From the above description, it will be apparent that the invention disclosed herein provides a novel and advantageous emulating agent and method for receiving numbers having signs, exponents, and significands having varying lengths and possibly configured in a variety of incompatible formats and reformatting the numbers into a standard uniform format for uniform arithmetic computations. As will be understood by those familiar in the art, the invention may be embodied in other specific forms without departing from its spirit or central characteristics, and thus, described embodiment set forth above is not restrictive of the scope of the invention. The following claims are indicative of the scope of the invention, and all variations which come within the meaning and range of equivalency of the claims are to be embraced within their scope.

What is claimed is:

1. A method for emulating a plurality of computational styles in a processor, said method comprising:

examining an instruction field of an instruction applied to said processor, wherein said instruction field determines a significand width of a data set included in said processor;

examining a first control field, wherein said first control field determines an exponent range of said data set included in said processor;

mapping components of said data set to a first set of computational styles provided said instruction field is included in said instruction, wherein said mapping to said first set of computational styles is configured to follow a computational model specified in a sequence of instructions;

mapping components of said data set to a second set of computational styles provided said instruction field is not included in said instruction, wherein said mapping to said second set of computational styles is configured to follow said computational model; and applying said instruction to said data set.

2. The method of claim 1, wherein said step of examining an instruction field determines an exponent range.

3. The method of claim 1, wherein said step of mapping components into said second set of computational styles further comprises examining a second control field, wherein said second control field determines significand width of said data set included in said processor.

4. The method of claim 1, wherein applying said instruction to said data set further comprises performing a mathematical computation between data elements included in said data set.

5. The method of claim 1, wherein said instruction comprises a mathematical computation.

6. The method of claim 1, wherein said instruction field comprises a completer, wherein said completer determines a single word.

7. The method of claim 1, wherein said instruction field comprises a completer, wherein said completer determines a double word.

8. The method of claim 1, wherein said first control field comprises a dynamic exponent field, said dynamic exponent field determined prior to application of said instruction to said processor.

9. A computer-readable medium in a digital processing system, the medium containing executable computer program instructions which, when executed in said digital processing system, cause said system to perform the steps comprising:

examining an instruction field of an instruction applied to said system, wherein said instruction field determines significand width of a data set included in said system;

examining a first control field, wherein said first control field determines an exponent range of said data set included in said system;

mapping components of said data set to a first set of computational styles provided said instruction field is included in said instruction, wherein said mapping to said first set of computational styles is configured to follow a computational model specified in a sequence of instructions;

mapping components of said data set to a second set of computational styles provided said instruction field is not included in said instruction, wherein said mapping to said second set of computational styles is configured to follow said computational model; and applying said instruction to said data set.

10. The method of claim 9, wherein said step of examining an instruction field determines an exponent range.

11. The method of claim 9, wherein said mapping of components into said second set of computational styles further comprises examining a second control field, wherein said second control field determines significand width of said data set included in said system.

12. The method of claim 9, wherein applying said instruction to said data set further comprises performing a mathematical computation between data elements included in said data set.

13. The method of claim 9, wherein said instruction comprises a mathematical computation.

14. A method for generating a uniform computational system in a processor, comprising:

loading data into the processor in a first format;

mapping a subset of the data to a register set;

examining an instruction field of an instruction applied to the processor to determine a significand width of the subset of the data;

examining a first control field to determine an exponent range of the subset of the data;

mapping components of the subset of the data to a first set of computational styles in accordance with a computational model when the instruction field is included in the instruction, otherwise;

mapping components of the subset of the data to a second set of computational styles in accordance with the computational model; and performing a mathematical computation on the data included in the register set.

* * * * *